United States Patent [19]

Pauli et al.

[11] Patent Number: 5,371,542
[45] Date of Patent: Dec. 6, 1994

[54] DUAL WAVEBAND SIGNAL PROCESSING SYSTEM

[75] Inventors: Myron R. Pauli, Vienna, Va.; Garry R. Katz, Lanham, Md.; Douglas Fraedrich, Alexandria, Va.; John Inderhees, Cincinnati, Ohio; Daniel Nordmeyer, Beanecreek, Ohio

[73] Assignee: The United States of America as represented by the Secretary of the Navy, Washington, D.C.

[21] Appl. No.: 903,218

[22] Filed: Jun. 23, 1992

[51] Int. Cl.$^5$ ............................................. H04N 3/14
[52] U.S. Cl. ................................... 348/262; 348/342; 348/25; 382/54
[58] Field of Search .................... 358/105, 167, 213.28, 358/166, 209; 382/48, 54; 342/90, 93, 159, 160, 161, 162; 364/516, 517; 250/330, 339, 342; 348/262, 342, 25, 153, 162, 47

[56] References Cited

U.S. PATENT DOCUMENTS

| | | | |
|---|---|---|---|
| H515 | 8/1988 | Holt | 358/108 |
| 4,072,863 | 2/1978 | Roundy | 250/332 |
| 4,603,430 | 7/1986 | Sacks | 382/28 |
| 4,672,439 | 6/1987 | Florence et al. | 358/225 |
| 4,718,028 | 1/1988 | Gussin et al. | 364/516 |
| 4,794,457 | 12/1988 | Gillet et al. | 358/162 |
| 4,959,714 | 9/1990 | Lo et al. | 382/22 |
| 5,025,143 | 5/1991 | Dayhoff | 250/203.3 |
| 5,132,802 | 7/1992 | Osthues et al. | 358/225 |
| 5,150,426 | 9/1992 | Bah et al. | 382/1 |
| 5,266,805 | 11/1993 | Edgar | 382/54 |

OTHER PUBLICATIONS

Application of Three-Dimensional Filtering to Moving Target Detection, Reed et al., IEEE Transaction on Aerospace and Electronic Systems vol. AES-19, No. 6 PP898-905, Nov. 1983.
Point Source Detection with Multiple Spectial Filters in a Staring Array Sensor J. Paul, et al., Proc. Iris, vol. 30, No. 1, pp. 231-265, 1985.
Issues and Techniques for Advanced Multispectral Dim Target Detection, Krykowski et al., Infrared Information Symposium, Environmental Research Institute of Michigan, Proceedings or Specialty Group on Targets Backgrounds and Discrimination, 1991.

*Primary Examiner*—James L. Dwyer
*Assistant Examiner*—Timothy J. May
*Attorney, Agent, or Firm*—Thomas E. McDonnell; Charles J. Stockstill

[57] ABSTRACT

A dual waveband signal processing system (DWSPS) is disclosed for differentiating between an primary target signal and background clutter to detect targets and objects with a particularly unique spectral characteristic. The DWSPS is responsive to a plurality of sensors operating on different wavelengths. The output wavebands of the sensors are filtered by either spatial or temporal high-pass filters, and is processed through a network comprising a series of multipliers, dividers, comparators, and subtractors to obtain the weighted correlation functions or "alpha coefficient", which, when compared to the input wavebands, produces a filtered or processed output signal of the detected features.

17 Claims, 5 Drawing Sheets

DUAL WAVEBAND SIGNAL PROCESSING SYSTEM

BACKGROUND OF THE INVENTION

1. Field of the Invention

The dual waveband signal processing system (DWSPS) is a system for processing detected emissions (infrared or similar spectral wavebands, X-rays and polarized) by a sensor to identify targets or objects with a particularly unique spectral characteristic against a complex cluttered background.

2. Description of Related Art

Infrared sensors have been developed over the past 20 to 25 years to achieve automatic target detection. Although some measures of success has been achieved for the systems, the performance has typically been significantly less than that promised. One of the reasons for this discrepancy is the problem of detecting the presence of a real target in the presence of background clutter. Where the background is the sky, the clutter is self-radiation and solar-scattering from the clouds. With the earth as a background, the clutter is produced by the temperature and emissivity variance of the ground and solar reflections from the surfaces of water, metal, or glass. Also, industrial activity produces very hot radiations and gaseous emissions from smoke stacks that can produce very high background environments. Unfortunately the background is not uniform and the spatial clutter interferes with the detection process. The operational environment of looking from an aircraft at the ground is one of the most severe infrared (IR) background emissions (ground clutter).

In the current technology, detected images are processed so as to extract target information at the receiver. Signal processing generally involves photodetection followed by some form of baseband waveform processing that is dependent on the models of photodetector outputs. This technology involves the taking of the ratios of the data in adjacent spectral bands. However, in the infrared spectrum, for instance, these methods are limited to an approach of color-ratioing after threshold discrimination on a single-color filtered band which lacks the high degree of sensitivity needed to detect the minute changes in IR intensity present in such cases as the vegetation utilized in the production of narcotics.

Another approach with two spectral bands is to use the high correlation between bands to predict the data in one band from the data in the other (linear regression).

One current method of processing the electro-optical signal is three-dimensional filtering. Three-dimensional filtering is a straightforward extension of one- and two-dimensional filter theory. The one-dimensional case derives optical filters in a single domain (usually time) for maximization of a temporal signal-to-noise ratio. Two-dimensional filter theory likewise derives optimal filters in two-dimensions (usually spatial coordinates) for a spatial signal-to-noise ratio. Three-dimensional filtering extends the concept of observing a spatial area over a fixed time period where it is natural to associate the dimensions of space, area and time to maximize a defined signal-to-noise ratio for a target with a given velocity.

A more recent method utilizes a six band sensor and a methodology for applying an eigenvalue transformation and principle component projection operator to remove most of the temperature variability and spectrally non-sensitive emissivity variations from the data.

SUMMARY OF THE INVENTION

An object of the invention is to provide a sensitive signal processor capable of detecting faint targets or objects with particularly unique spectral characteristics against a complex cluttered background.

Another object of the invention is to enable detection of targets at longer ranges than are currently attainable.

A further object of the invention is to ameliorate the effects of "anomalies" such as inactive, saturated, or intermittently-behaving sensor pixels and scene anomalies in the processing of infrared, or similar spectral waveband emissions.

The dual waveband signal processing system (DWSPS) utilizes two-color filtering to differentiate between an infrared or other similar spectral waveband emission and background clutter so as to detect targets and objects with a particularly unique spectral characteristic. Modified, digitized signals from the output of two, different spectral bands are utilized by the DWSPS to produce a "spectrally filtered" output.

The waveband output from a plurality of sensors is corrected for any nonuniformity that may exist in sensor response. The digitized signal is filtered by either spatial or temporal high-pass filters. The resultant filtered signals are processed by an arithmetic circuit which includes a series of multipliers, divider, adders, averager, comparator, and subtractor to obtain the weighted correlation function, or "alpha coefficient", which, when compared to the input wavebands, produces a filtered or processed output signal of the detected infrared features.

These and other features and advantages of the present invention will become more apparent with references to the following detailed description and drawings. However, the drawings and description are merely illustrative in nature and not restrictive.

DESCRIPTION OF THE PREFERRED EMBODIMENTS

Electro-optical detection of objects is limited either by the inherent noise in the sensor or by the background emissions within the area in which the target is located. This limitation is applicable whether the target is to be detected utilizing emissions from either the visible or invisible (infrared, ultraviolet or polarized) spectral region. Solutions in the past to overcome this deficiency have been either the use of a sensor with "low" noise or to provide a detector with a large optical aperture to acquire a target signal of sufficient strength to standout from the background noise. However, these solutions have not proven to be adequate because the use of a highly sensitive detector or a larger optical aperture will not only produce an increased target signal but will also, bring in a stronger emission from the background clutter.

Many electro-optic sensors are monochromatic or a one-dimensional (e.g., one color) and operate within a specifically chosen spectral band to maximize the target emission when compared with the background emissions. However, the target emission may be buried within the emissions of the background or false targets.

Figure 1A:
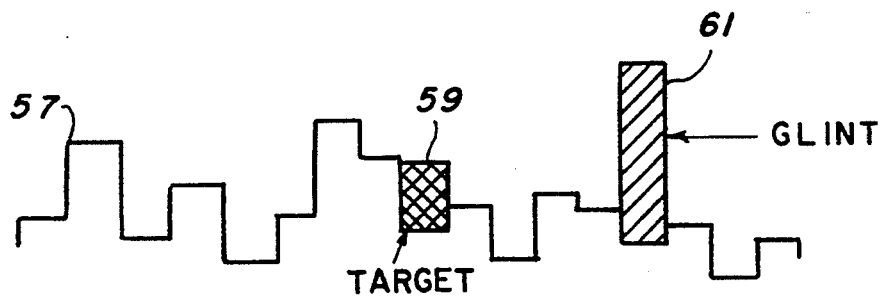
FIG. 1(a) illustrates a primary spectral band digital signal.

The one-dimensional sensor observes a complex scene and detects the weak emissions of a target 59 within the strong background emissions 57, as illustrated in FIG. 1a. This weak unfiltered emission is referred to as the primary spectral band. Also, reflections of sunlight off the water, glass or metallic objects ("glints") 61 will provide far stronger spectral emissions than either the target 59 or the background 57, but these are not of interest and interfere with the performance of the sensor system.

Figure 1B:
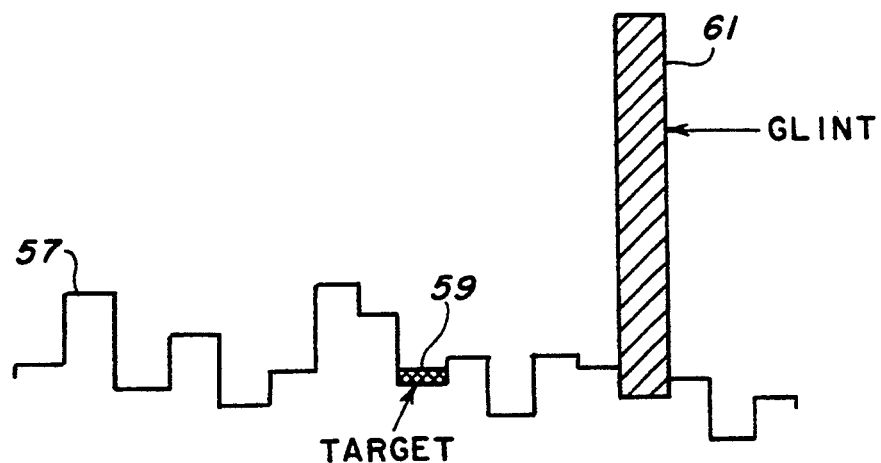
FIG. 1(b) illustrates a reference band digital signal.
Figure 1C:
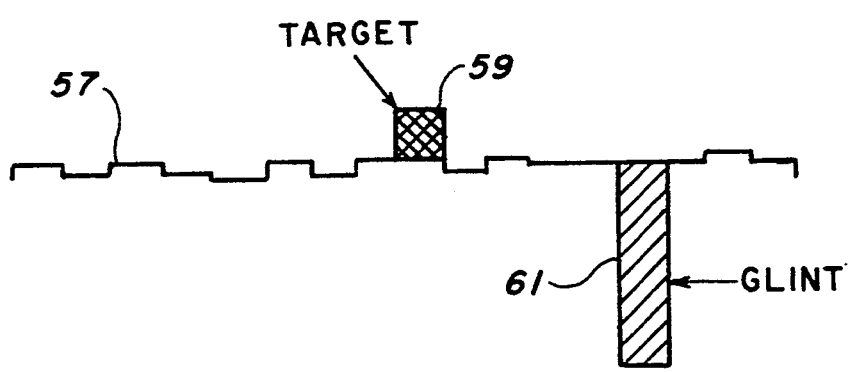
FIG. 1(c) illustrates the results of spectral filtering.

Filtration of the one-dimensional system is achieved by the generation of a "reference" color band which is similar to the primary color band except that the target emission is very weak, or nearly absent, as illustrated in FIG. 1b. A reference color band is defined as a band which is similar to the primary color band except that the emissions of the target are very weak or nearly absent. In the reference color band the emission of the "glint" 61 may be stronger than actually found in the primary color band. This is often true for color/spectral bands that are close apart such as yellow and "yellow-orange" in the visible spectrum. In the thermal-dominated infrared, there is little difference in the backgrounds between closely spaced color bands. After filtration, both the background 57 and "glint" 61 are suppressed and the emission from the target 59 is prominently displayed, as illustrated in FIG. 1c.

Two-color sensors have been utilized to resolve the problem of low resolution of the target with respect to the two-dimensional background emissions found in the one-dimensional sensor system. In the two-color sensor system, if the brightest emissions from objects are larger in the reference color band than in the primary color band, the emission of the object was rejected. These sensors, however, work on the principle that the target had to be brighter than the background in the primary band.

With the dual waveband signal processing system (DWSPS) of the invention, the problem of the target emission being "buried" in the background clutter is resolved. For the situation where the airborne or space-borne sensor observes targets against complex background objects, or a land/sea-borne sensor against a complex cloud clutter, the target is not only more observable but may also be detected at longer ranges. The DWSPS utilizes two-color filtering to differentiate between a desired spectral emission of a target and the background clutter emission. Modified, digital emission signals from the output of two different spectral bands, as illustrated in FIGS. 1a, and 1b, are utilized to produce a "spectrally filtered" output as depicted in FIG. 1c.

One sensor operating in two spectral bands (or two nearly aligned sensors operating in one spectral band each) produces analog voltage outputs which are then digitized by an analog-to-digital converter into digital outputs from the two spectral bands designated the primary "P" band and the reference "B" band. The digitized outputs from, for example, two-color sensors are respectively normalized to a calibrated reference in associated non-uniformity correctors. These normalized digital outputs are the input signal that is applied to a dual waveband signal processor (DWSP). Within the DWSP, a reference "B" band digital "frame", corrected for an "alpha coefficient", is subtracted from the comparable primary "P" band digital "frame" to produce the "spectrally filtered" frame, "F", which is supplied to an indicator device outside the scope of the system. (The digital "frames" are strings of digital data that appear at the same clock time at the input of the high-pass filters of the DWSP.) In this spectrally filtered image frame, "F", the targets with unique spectral characteristics will be greatly heightened when compared with the background emissions.

In the detection of the emission from desired objects, the electro-optical sensors must take data that is relatively close together in time and in sensor field-of-view alignment (between the two wavebands) without the background emission interfering with the target, or primary, emission, as is disclosed below.

Figure 2:
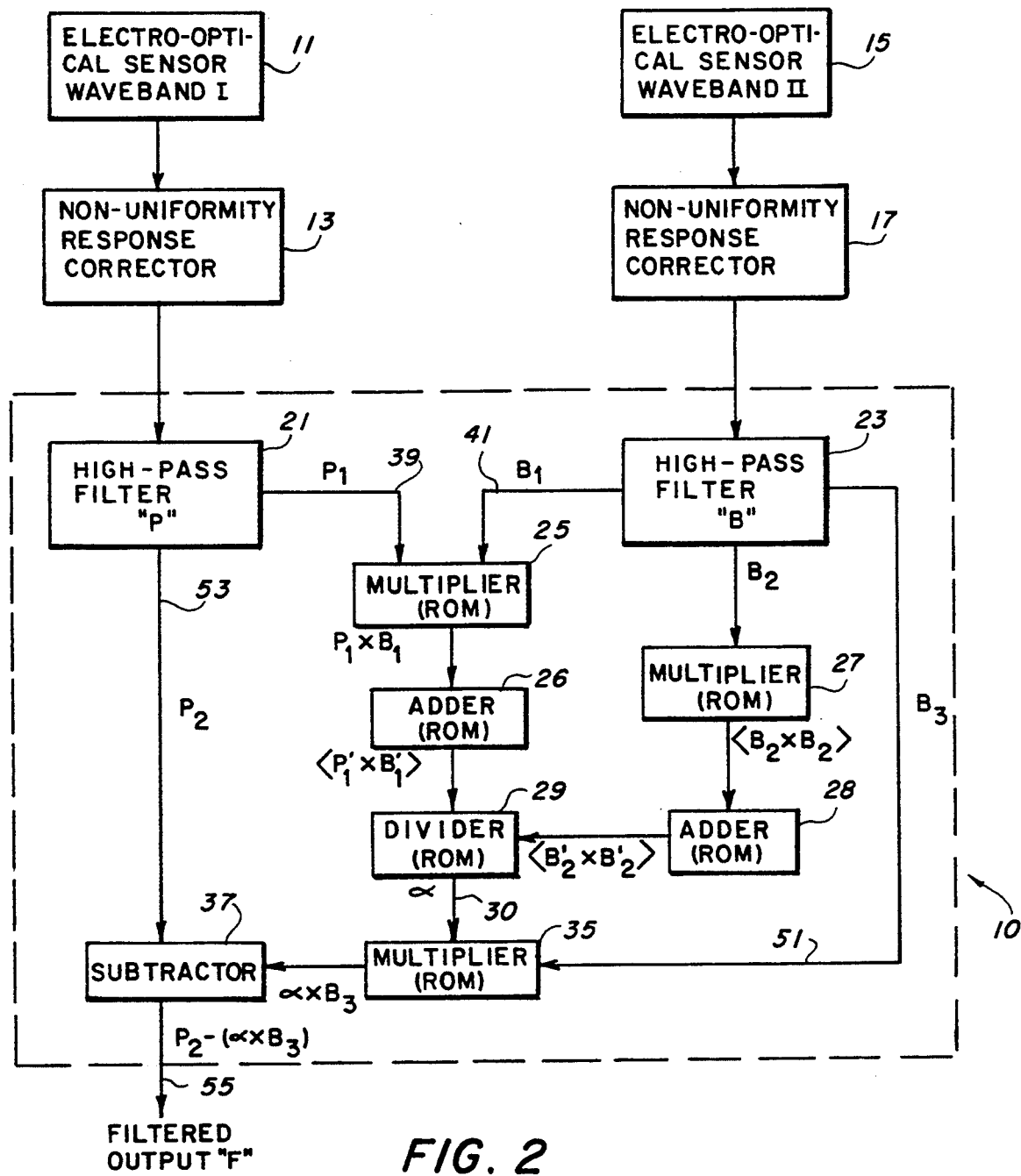
FIG. 2 is a schematic block diagram of a preferred embodiment of the Dual Waveband Signal Processing System (DWSPS) of the invention.

In the preferred embodiment illustrated in FIG. 2, the signal processor for overcoming the interference on the target signal by the background signal is disclosed. By the use of a dedicated hardware circuit, the infrared or optical energy of a terrestrial or celestial scene (or target) is detected by two or more infrared sensors 11 and 15. Each of the sensors 11 and 15 measures a different spectral wavelength within the infrared spectrum and provides a digital output of spectral intensity and angular location. In the present invention, the sensor capabilities are not limited to use in only the infrared spectrum. Electromagnetic, ultraviolet or any other emission up to, and including, X-ray and polarization sensor outputs can be processed by the Dual Waveband Signal Processing System (DWSPS). Each of the sensors 11 an 15 may be comprised of multiple scanners in an array, one or two-dimensional scanners or a single sensor being scanned over the search scene. Further, the DWSP can process input signals with two different polarizations instead of two spectral bands as a means for locating weak but partially polarized targets.

Each of the sensors 11 and 15 measures a different wavelength within the infrared spectrum and provides a digital output of spectral intensity, angular location and elevation. In sensor 11 Waveband I or "P" is the primary waveband of the selected target, and in sensor 15 Waveband II or "B" is the background or clutter waveband anticipated in the area of the primary target.

Non-Uniformity Response Correctors (NUC) 13 and 17, respectively, correct the outputs of the sensors 11 and 15 by a series of reference coefficients. These reference coefficients are obtained from such means as a running sum of previous sensor responses and/or stored calibration image frames obtained from a uniform test source to correct for any non-uniformity in the signal detected by the sensor. Typically, a sensor utilizing the NUC is calibrated with one or more uniform temperature sources, such as ice. The corrected sensor signal that is outputted by the NUC turns the raw data from the sensor into what a theoretically average detector would detect when viewing the target scene. The outputs of the NUC device 13 and 17 are applied to high-pass filters 21 and 23, respectively, of the dual waveband signal processor 10.

Each of the high-pass filters 21 and 23 may be either a spatial, temporal filter or a combined spatio-temporal filter. In the preferred embodiment each of the high-pass filters 21 and 23 is a median spatial filter. However, various other types of high-pass filters can be used, such as temporal difference filters, a DC level subtraction filter, a Least Mean Squares (LMS) spatial filter, a three-dimensional temporal-spatial filter, a median spatial filter, a maximum spatial filter, a temporal second derivative filter, a spatial second derivative filter, or any other high-pass filter. Also, the digital spatial and temporal filters may be programmed on computers and parallel processing machines in lieu of a dedicated electronics, as shown in the preferred embodiment. Although, for best results, the same type of high-pass filtering operation should be performed for both of the filters 21 and 23.

The high-pass-filter 21 for the "P" waveband develops two filtered "P" outputs 39 and 53. Output 53 is applied to a subtractor 37 where it will be further processed, as discussed later. Output 39 is applied to a multiplier 25. The high-pass filter 23 for the "B" waveband develops three filtered "B" outputs 41, 43 and 51. Output 41 is multiplied in the multiplier 25 with the output of the high-pass filter 21 to produce a signal, P×B, which is in turn applied to an adder 26. The output 43 is applied to a multiplier, or squarer, 27 to produce a squared signal (B×B), which is applied to an adder 28. The output 51 is applied to a multiplier 35, which will be described later.

The adders 26 and 28 add the signals from a selected neighborhood of the individual sensor pixels (spatial-/angular output) of the outputs of the multiplier 25 and the multiplier 27, respectively. The output signals of the adders 26 and 28, respectively, correspond to $<P'\times B'>$ and $<B'\times B'>$, where the brackets $<\ >$ represent a sum and/or weighted average. These outputs of the adders 26 and 28 are applied to divider 29.

Divider 29, computes the ratio ($<P'\times B'>/<B'\times B'>$) of the $<P'\times B'>$ output of adder 26 and the $<B'\times B'>$ output of the adder 28. This output 30 of the divider 29 is the "Alpha Coefficient", $\alpha$.

Multiplier 35 multiplies the unprocessed background "B" signal 51 from high-pass filter 23 by $\alpha$, the "alpha coefficient", to produce a weighted reference coefficient, ($\alpha\times B$), to correct for the noise of the background clutter. The weighted reference coefficient, ($\alpha\times B$) is applied to the subtractor 37 where it is subtracted from the unprocessed "P" output of the primary band high-pass filter 21. This provides a filtered signal output of the processor, "F" 55, that is usable in an audio or visual display, indicator to indicate the presence of the desired spectral objective within the scene surveyed by the sensor device.

The mathematical representation of "F" is as follows:

$$F = P - ([<P'\times B'>/<B'\times B'>]\times B)$$

$$F = P - (\alpha \times B)$$

The subtraction technique in the subtractor 37 corrects for the range dependent atmospheric effects upon the infrared signal detected at the sensors 11 and 15.

Figure 3:
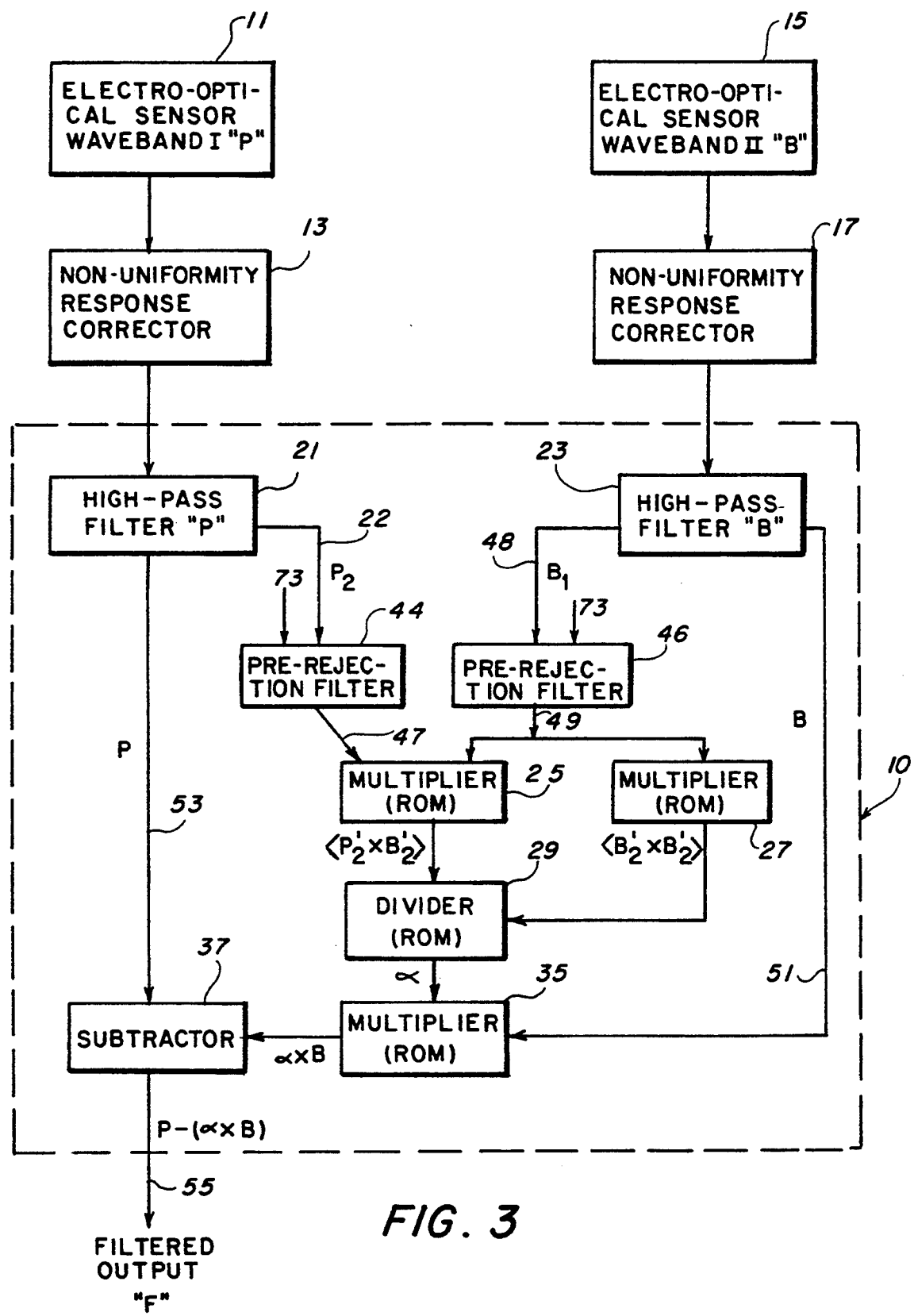
FIG. 3 is a schematic block diagram of a second embodiment of the Dual Waveband Signal Processing System of the invention utilizing a pre-rejection filter.

In a second embodiment illustrated in FIG. 3, pre-rejection filters 44 and 46 are installed at the outputs of the high-pass filters 21 and 23, respectively. Each of the pre-rejection filters 44 and 46 is utilized to ameliorate the effects of anomalies which may occur within the DWSP system. These anomalies include hardware anomalies such as inactive, saturated, or intermittently-behaving sensor pixels and scene anomalies such as explosions, direct sun-viewing, solar reflections, and very bright objects. Pre-rejection filters that operate on the principle of comparing the scene with the statistical properties of the scene may employ such techniques as the standard deviation, average absolute value, or other histogramming techniques.

In this embodiment, the two outputs of high-pass filter 21 are respectively applied to subtractor 37 and the pre-rejection filter 44. High-pass filter 23 also has two outputs which are respectively applied to pre-rejection filter 46 and multiplier 35.

Figure 4:
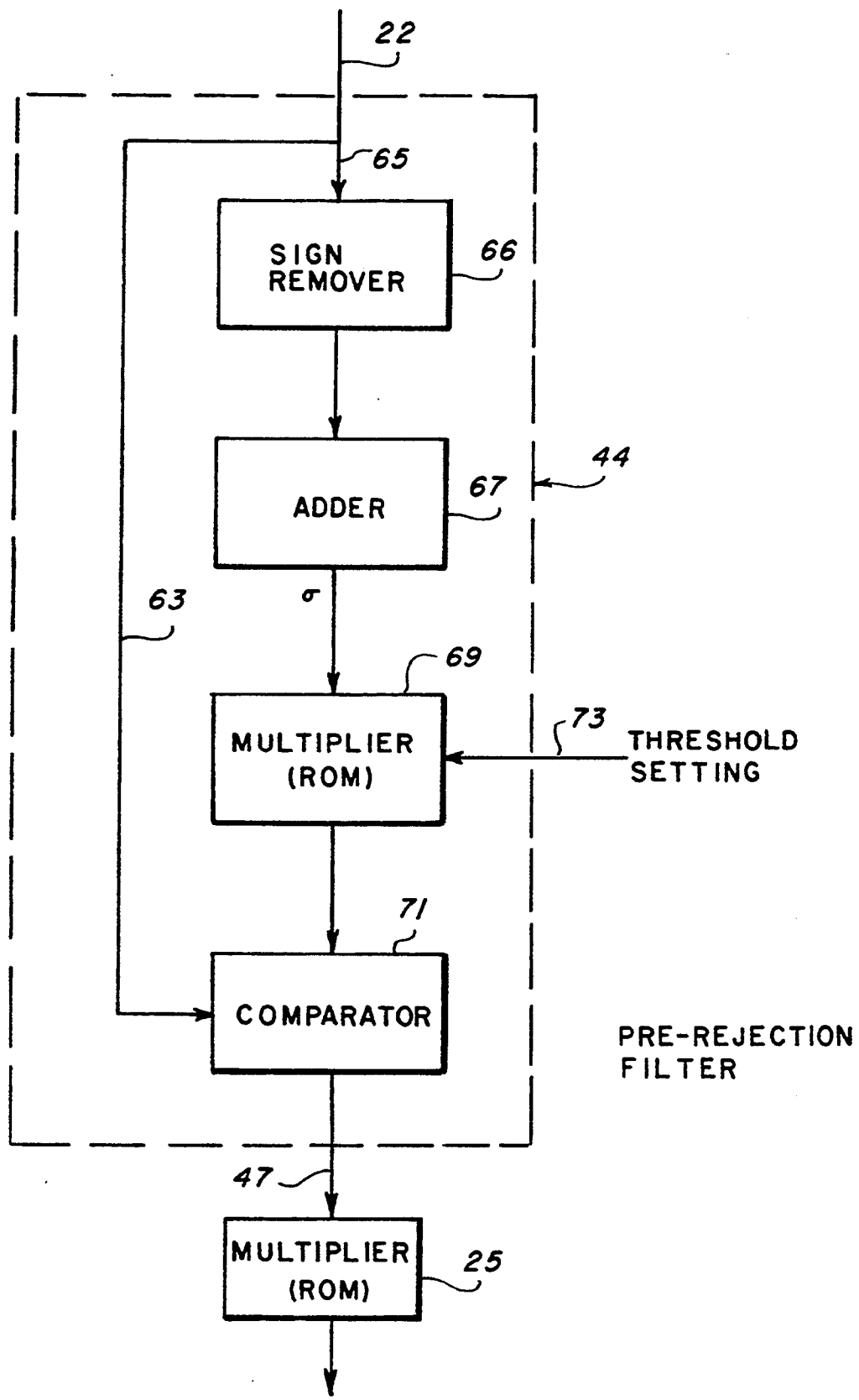
FIG. 4–5 illustrate typical pre-rejection filters.

The structure and operation of the pre-rejection filter 44 is similar to that of the pre-rejection filter 46 (to be discussed later). FIG. 4 illustrates the pre-rejection filter 44. The output 22 of high-pass filter 21 is applied to the pre-rejection filter 44, where it is applied in parallel to a comparator 71 (to be discussed later) and to a sign remover 66 which removes the plus or minus sign (usually one digital bit) on the digital word. This sign remover 66 may be a logic device or similar device. The output of the sign remover 66 is the absolute value of the output of the high-pass filter 21 and is applied to an adder 67.

In adder 67 the respective absolute values for a selected spatial/angular neighborhood of detector/pixel values are added resulting in a term referred to as $\sigma$. These preselected values of neighbors are chosen to provide: (1) enough statistics for a meaningful histogramming (where a large number of neighbors are desired) and (2) a small enough group of neighbors to simplify computations and not have many more than one anomaly present. In this embodiment, a 7×7 neighborhood of sensor outputs are used (49 outputs) although other definitions of neighborhood are permissible.

The output of the adder 67, $\sigma$, is applied to multiplier 69 where a user-supplied threshold setting 73 is multiplied with the output of the adder 67. The user-supplied threshold setting 73 is used to properly measure the true background independent of anomalies. Accordingly, a 3($\sigma$/n) threshold (where $\sigma$/n is the average absolute value of the neighbors) is typically utilized. A number other than 3 is permissible and, for some applications, may be more desirable. The threshold setting 73 can be resident in the multiplier or it may be supplied from an external source (not shown) and selected by a sensor operator to provide a desired condition.

When $\sigma$, the number of neighbors added in the adder, is 49, then (3/49×$\sigma$) is applied to the comparator 71 where it is compared to the output 22 of the high-pass filter 21. If the value of the digital signal of the output 22 from the high-pass filter 21 exceeds the value of the output of multiplier 69, the comparator 71 develops a zero output. If the value of the output 22 of the high-pass filter 21 is equal to or less than the output of the multiplier 69, the comparator 71 applies the output 22 of the high-pass filter 21, unchanged, to the multiplier 25 of the DWSP.

Figure 5:
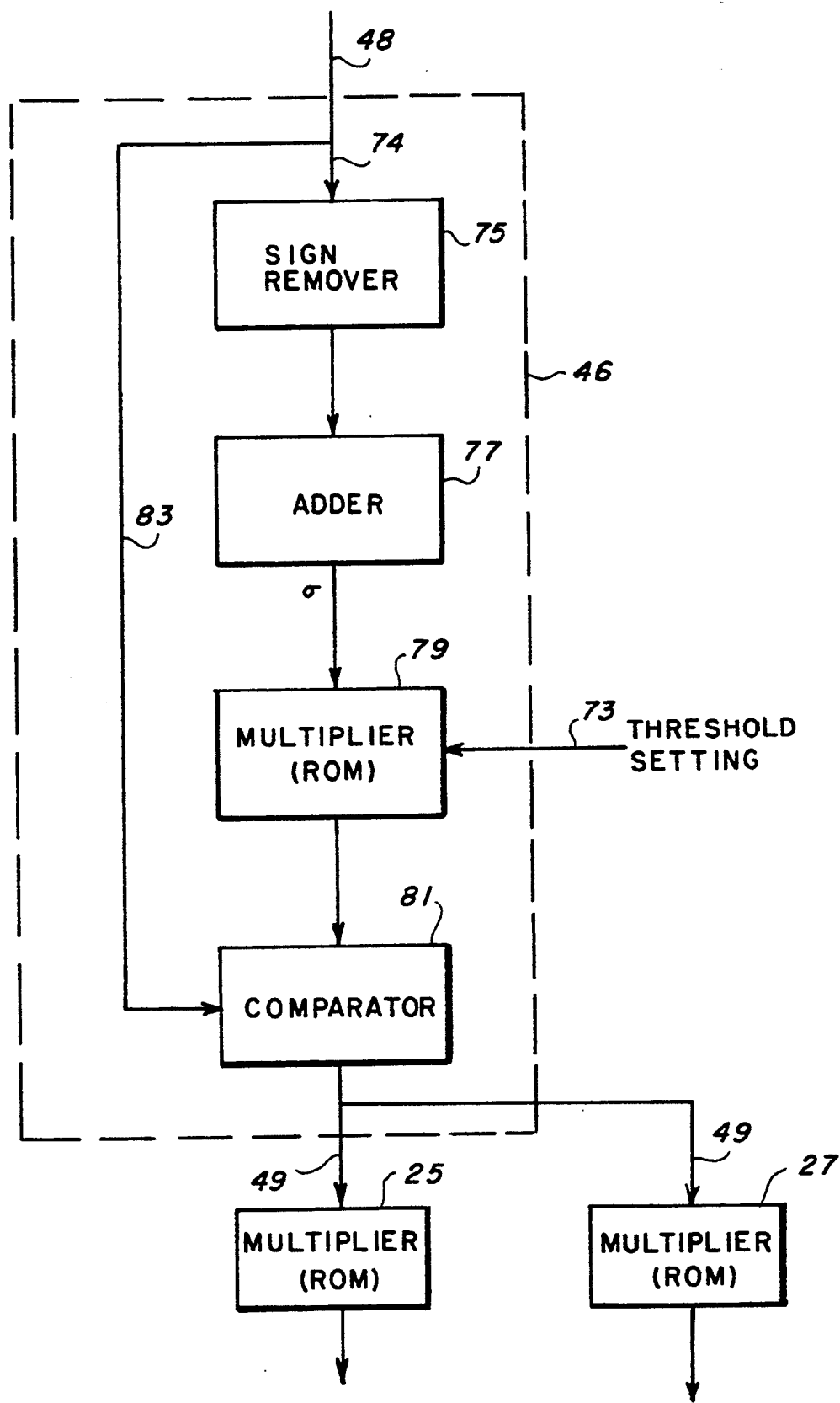

FIG. 5 illustrates the pre-rejection filter 46. The output 48 of high-pass filter 23 is applied to pre-rejection filter 46, where it is applied in parallel to a comparator 81 (to be discussed later) and to sign remover 75. The operation of the sign remover 75, adder 77, multiplier 79 and comparator 81 is identical to the similar components sign remover 66, adder 67, multiplier 69 and comparator 71 of the pre-rejection filter 44, as shown in FIG. 4. However, the output of comparator 81 is applied differently. In parallel, the output 49 is applied to multiplier 25 and multiplier 27.

Further processing after the pre-rejection filtering, in this embodiment of the DWSP, is the same as described in the preferred embodiment.

Using the pre-rejection filtering technique, the signal processor 10 can correct for bad detection hardware, readout errors and large, point-like clutter features in the nearby background scenes.

In both embodiments, the filtered signal output, "F", from the subtractor 37, is a factor of as much as 70 times more sensitive than an electro-optical system using the approach of color-rationing after threshold discrimination on a single-color filtered band. The resultant digital signal, "F", supplied to a display device (not shown) has been likened to the needle (the desired spectrally unique target) in the haystack (the spectral background wavelengths) when the haystack (clutter) has been removed. The range in azimuth and elevation applied to the indicator device is greatly increased allowing detection of the desired objects spectral wavelength at a much greater range that conventional means of filtering have provided.

Using the invention, a survey may be made of areas to determine the presence of vegetation growths of such marihuana or other illegal narcotics, as well as surveying areas for environmental hazards such as discharges of particulate or liquids from industrial facilities that are in violation of the law.

Numerous modifications and adaptations of the present invention will be apparent to those skilled in the art. For example, in other embodiments the adders, multipliers, dividers, comparator and subtractor contained in the embodiments described may be embedded in programmable VHSIC/VLSI devices, array processors or high speed computers. Thus it is intended that by the following claims to cover all modifications and adaptations which fall within the true spirit and scope of the present invention.

Although the invention has been described in relation to the exemplary preferred embodiments thereof, it will be understood by those skilled in the art that still other variations and modifications can be affected in these preferred embodiments without detracting from the scope and spirit of the invention.

What is claimed is:

1. A signal processing system comprising:
   means for detecting an image signal comprised of primary color image emissions and a background color image emissions;
   means for computing a factor comprised of a ratio of a weighted average of a product of the primary image emissions and the background color image emissions divided by a weighted average of the square of the background color image emissions; and
   means responsive to the factor, primary color image emissions, and background color image emission to produce an output target signal having no background color image emissions.

2. A signal processing system comprising:
   at least one sensor for detecting an image signal comprised of primary color image emissions (P);
   at least one sensor for detecting an image signal comprised of background color image emissions (B);
   means for storing individual frames of said primary color image emissions (P) and background color image emissions (B);
   means for generating and storing a calibration image;
   means for correcting said primary color image emissions (P) and said background color image emissions (B) by applying to said primary color image emissions (P) and background color image emissions (B) a reference coefficient obtained by comparing the stored primary color image emission (P) and background color image signal (B) with said calibration image for correcting any differences between the..primary color image emissions (P) and background color image emissions (B) so as to produce uniform background color image emissions (P) and uniform background color image emissions (B);
   means for filtering the uniform primary color image emission (P) and secondary color image signal (B) to produce first ($P_1$) and second ($P_2$) filtered uniform primary color image emissions and first ($B_1$), second ($B_2$) and third ($B_3$) filtered uniform background color image emissions;
   means responsive to said first filtered uniform primary color image emission ($P_1$) and said first ($B_1$) and second ($B_1$) filtered uniform background color image emissions for calculating an alpha coefficient ($\alpha$) which is comprised of a ratio of a weighted average of a product $<P_1 \times B_1>$ of said first filtered uniform primary color image emissions ($P_1$) and said first filtered uniform background color image emissions ($B_1$) divided by a weighted average of the square of the second filtered uniform background color image emissions $<B_2 \times B_2>$; and
   means for adjusting the second filtered uniform primary color image emissions ($P_2$) signal by subtracting the product ($\alpha \times B_3$) of the alpha coefficient ($\alpha$) and the third filtered uniform background color image emissions ($B_3$) from the second filtered uniform primary color image emissions ($P_2$) to produce an output signal ($P-(\alpha \times b_3)$) with no background Color image emissions (F).

3. The system of claim 1 further including means for ameliorating animalities in the filtered uniform primary color image emission and background color image emissions.

4. The system of claim 3, wherein said means for ameliorating anomalies is a pre-rejection filter.

5. The system of claim 2 wherein said sensors are electromagnetic sensors.

6. The system of claim 2 wherein said sensors are infrared sensors.

7. The system of claim 2 wherein said sensors are ultraviolet sensors.

8. The system of claim 2 wherein said sensors are x-ray sensors.

9. The system of claim 2 wherein said sensors are polarization sensors.

10. The system of claim 2 wherein said sensors are selected from the group consisting of electromagnetic sensors, infrared sensors, ultraviolet sensors, x-ray sensors, polarization sensors and any other emission sensor.

11. The system of claim 2 wherein said filtering means includes means for high-pass filtering the uniform primary color image emission and a means for high-pass filtering the background color image emissions.

12. The system of claim 11, wherein said means of high-pass filtering is a spatial filter.

13. The system of claim 11, wherein said means of high-pass filtering is a temporal filter.

14. The system of claim 11, wherein said means of high-pass filtering is a spatio-temporal filter.

15. The system of claim 11, wherein said means of high-pass filtering is selected from the group consisting of a three-dimensional temporal-spatial filter, a DC level subtraction filter, a least mean squares spatial filter, a median spatial filter, a maximum spatial filter, a temporal difference filter, a temporal difference filter, a temporal second derivative filter, a spatial second derivative filter and any other similar high-pass filter.

16. The system of claim 2, wherein said means for calculating an alpha coefficient ($\alpha$) and for adjusting the second filtered uniform primary color image emissions ($P_2$) is selected from a group consisting of an electronic circuit, a programmable VHSIC/VSLI device, an array processor and a high-speed computer.

17. A method for obtaining a sensor signal without clutter comprising the steps of:
  detecting a plurality of spectral emissions comprised of primary color image spectral emissions and a background color image spectral emission;
  storing individual frames of the primary and background color image spectral emissions;
  generate and store a calibration image;
  processing the detected primary and background color image spectral emissions by comparing the individual frames of said emissions with the calibration image to obtain a uniform primary color image emissions and uniform background color image emissions;
  filtering, respectively, the uniform primary and background color image spectral emissions;
  computing an alpha coefficient comprised of a ratio of an average of a product of the uniform primary color image spectral emissions and the uniform background color image spectral emission divided by the average of the square background color image spectral emissions; and
  subtracting the product of the alpha coefficient and the background color image spectral emissions from the primary color image spectral emissions to provide an output signal without the background color image spectral emissions.

* * * * *